(12) United States Patent
Goto et al.

(10) Patent No.: US 6,245,411 B1
(45) Date of Patent: Jun. 12, 2001

(54) HIGH RIGIDITY GLASS-CERAMIC SUBSTRATE FOR A MAGNETIC INFORMATION STORAGE MEDIUM

(75) Inventors: Naoyuki Goto, Sagamihara; Kousuke Nakajima, Samukawa-machi; Junko Ishioka, Sagamihara, all of (JP)

(73) Assignee: Kabushiki Kaisha Ohara, Kanagawa-ken (JP)

(*) Notice: Subject to any disclaimer, the term of this patent is extended or adjusted under 35 U.S.C. 154(b) by 0 days.

(21) Appl. No.: 09/203,187

(22) Filed: Nov. 30, 1998

(30) Foreign Application Priority Data

Sep. 25, 1959 (JP) .................................................. 10-271085
Feb. 26, 1998 (JP) .................................................. 10-062192

(51) Int. Cl.$^7$ .................................................. G11B 05/82
(52) U.S. Cl. .................................................. 428/141; 428/694 ST; 428/694 SG; 428/900; 501/9; 501/69; 501/70
(58) Field of Search .................................................. 501/10, 57, 59, 501/67, 69, 70, 9; 428/694 ST, 694 SG, 141, 900

(56) References Cited

U.S. PATENT DOCUMENTS

| 3,490,888 | | 1/1970 | Strong . | |
| 5,001,086 | * | 3/1991 | Carrier et al. | 501/9 |
| 5,491,116 | | 2/1996 | Beall et al. . | |
| 5,532,194 | * | 7/1996 | Kawashima et al. | 501/9 |
| 5,561,089 | | 10/1996 | Ishizaki et al. . | |
| 5,658,835 | * | 8/1997 | Onitani et al. | 501/9 |

FOREIGN PATENT DOCUMENTS 10-1327    1/1998   (JP) .

* cited by examiner

Primary Examiner—Stevan A. Resan
(74) Attorney, Agent, or Firm—Hedman & Costigan, P.C.

(57) ABSTRACT

A high rigidity glass-ceramic substrate for a magnetic information storage medium has a ratio of Young's modulus to specific gravity within a range from 37 to 63 and comprises $Al_2O_3$ within a range from 10% to less than 20%. Predominant crystal phases of the glass-ceramic substrate consist of (1) cordierite or cordierite solid solution and (2) one or more crystals selected from the group consisting of Spinel crystal, Spinel crystal solid solution, enstatite, enstatite solid solution, β-quartz and β-quartz solid solution.

8 Claims, No Drawings

HIGH RIGIDITY GLASS-CERAMIC SUBSTRATE FOR A MAGNETIC INFORMATION STORAGE MEDIUM

BACKGROUND OF THE INVENTION

This invention relates to a glass-ceramic substrate for a magnetic information storage medium used in an information storage device and, more particularly, to a glass-ceramic substrate for a magnetic information storage medium such as a magnetic disk substrate having a highly smooth substrate surface suitable for use in a near contact recording or a contact recording used mainly in the ramp loading system and also having a high Young's modulus and low specific gravity capable of coping with a high speed rotation of the storage medium. The invention relates also to a method for manufacturing this glass-ceramic substrate for a magnetic information storage medium. This invention relates further to a magnetic information storage medium made by forming a film on such glass-ceramic substrate for a magnetic information storage medium. In this specification, the term "magnetic information storage medium" includes fixed type hard disks, removable type hard disks and card type hard disks used respectively such as so-called hard disks for personal computers and other magnetic information storage medium in the form of a disk which can be used for storage of data and can be also used in digital video cameras and digital cameras.

In contrast to conventional fixed type magnetic information storage devices, there have recently been proposed and put into practice magnetic information storage device of a removable type or a card type and developments of applications thereof for digital video cameras and digital cameras have been started. Such tendency relates to utilization of personal computers for multi-media purposes and prevailing of digital video cameras and digital cameras and, for handling data of a large size such as data of a moving image or voice, there is an increasing demand for a magnetic information storage device of a larger storage capacity. For coping with this demand, a magnetic information storage medium is required to increase its bit and track density and increase the surface recording density by reducing the size of the bit cell. On the other hand, as for a magnetic head, there is an increasing tendency toward adopting the near contact recording system and further the contact recording system according to which the magnetic head operates in closer proximity to the disk surface in accordance with the reduction of the bit cell size.

Aluminum alloy has been conventionally used as a material of a magnetic information storage medium substrate. The aluminum alloy substrate, however, tends to produce a substrate surface having projections or spot-like projections and depressions during the polishing process due to defects inherent in the material. As a result, the aluminum alloy substrate is not sufficient in flatness and smoothness as the above described magnetic information storage medium substrate of high recording density. Further, since the aluminum alloy is a soft material, its Young's modulus and surface hardness are low with the result that a significant degree of vibration takes place during rotation of the disk drive at a high speed rotation which leads to deformation of the disk and hence it is difficult to cope with the requirement for making the disk thinner. Furthermore, the disk tends to be deformed due to contact with the magnetic head with resulting damage to the contents of the disk. Thus, the aluminum alloy cannot cope sufficiently with the requirement for recording with a high recording density.

As a material for overcoming the above problems of the aluminum alloy substrate, known in the art are chemically tempered glasses such as alumino-silicate glasses ($SiO_2$—$Al_2O_3$—$Na_2O$) disclosed in Japanese Patent Application Laid-open No. Hei 8-48537 and Japanese Patent Application Laid-open No. Hei 5-32431. This material, however, has the following disadvantages:

(1) Since polishing is made after the chemical tempering process, the chemically tempered layer is seriously instable in making the disk thinner. Further, the chemically tempered layer causes change with time after use for a long period of time with resulting deterioration in the magnetic property of the disk.

(2) Since the chemically tempered glass contains $Na_2O$ and $K_2O$ as its essential ingredients, the film forming property of the glass is adversely affected, and a barrier coating over the entire surface of the glass becomes necessary for preventing elution of $Na_2O$ and $K_2O$ ingredients and this prevents stable production of the product at a competitive cost.

(3) The chemical tempering is made for improving mechanical strength of the glass but this basically utilizes strengthening stress within the surface layer and the inside layer of the glass and hence its Young's modulus is about 83 GPa or below which is about equivalent to ordinary amorphous glass. Therefore, use of the glass for a disk with a high speed rotation is limited and hence it is not sufficient for a magnetic information storage medium substrate.

Aside from the aluminum alloy substrate and chemically tempered glass substrate, known in the art are some glass-ceramic substrates. For example, Japanese Patent Application Laid-open No. Hei 9-35234 and EP0781731A1 disclose glass-ceramic substrates for a magnetic disk made of a $Li_2O$—$SiO_2$ system composition and has crystal phases of lithium disilicate and β-spodumene, or crystal phases of lithium disilicate and β-cristobalite. In these publications, however, the relation between Young's modulus and specific gravity with respect to high speed rotation is not taken into consideration or suggested at all. The upper limit of Young's modulus of these glass-ceramics is no more than 100 GPa.

For improving the Young's modulus, Japanese Patent Application Laid-Open No. Hei 9-77531 discloses a glass-ceramic of a $SiO_2$—$Al_2O_3$—$MgO$—$ZnO$—$TiO_2$ system which contains a large amount of Spinel crystal as its predominant crystal phase and $MgTi_2O_5$ and several other crystals as its subordinate crystal phases and has Young's modulus of 93.4 GPa to 160.11 GPa and a substrate for a high-rigidity magnetic disk made of this glass-ceramic. The glass-ceramic has, as its predominant crystal phase, Spinel crystal represented by (Mg/Zn) $Al_2O_3$ and/or (Mn/Zn)$_2$ $TiO_4$ containing a large amount of $Al_2O_3$ and has several other optional crystals as its subordinate crystal phaes. This glass-ceramic is significantly different from the glass-ceramic of the present invention which, as will be described later, contains a relatively small amount of $Al_2O_3$ and has a high Young's modulus and a low specific gravity. Addition of such a large amount of $Al_2O_3$ is undesirable from the standpoint of production because it causes deterioration of melting property of the base glass and also deterioration of resistance to devitrification. Further, in this publication, the relation of Young's modulus (GPa)/specific gravity and the value of specific gravity per se which are necessary for the high speed rotation are not taken into consideration or suggested at all. Particularly, the specific gravity in this publication is a high value of 2.87 or over. This publication therefore merely proposes a glass-ceramic substrate made of a rigid material. Moreover, the glass-ceamic of this system has the serious disadvantage that processability is poor and therefore is not suited for a large scale production since it is too hard and hence the improvement of this glass-ceramic as a high recording density magnetic information storage medium substrate is still not sufficient.

It is therefore an object of the invention to eliminate the above described disadvantages of the prior art materials and provide a glass-ceramic substrate for a magnetic information storage medium capable of coping with the tendency toward a high recording density recording, namely having excellent melting property, resistance to devitrification and processability, excellent smoothness of the surface of the substrate which is sufficient for contact recording of a high recording density and having a high value of Young's modulus and a low value of specific gravity which are sufficient for a high speed rotation of the disk.

It is another object of the invention to provide a magnetic information storage medium made by forming a film of a magnetic medium on this glass-ceramic substrate.

SUMMARY OF THE INVENTION

Accumulated studies and experiments made by the inventors of the present invention for achieving the above described objects of the invention have resulted in the finding, which has led to the present invention, that for coping with driving of the disk with a high speed rotation, a magnetic information storage medium substrate must have a high rigidity and a low specific gravity for preventing vibration of the disk caused by deflection and that an optimum ratio of Young's modulus to specific gravity of the substrate is:

Young's modulus (GPa)/specific gravity=37 to 63.

The inventors of the present invention have also found that a glass-ceramic substrate for a magnetic information storage medium can be produced which has predominant crystal phases limited to (1) cordierite or cordierite solid solution and (2) one or more crystals selected from the group consisting of Spinel crystal, Spinel crystal solid solution, enstatite, enstatite solid solution, β-quartz and β-quartz solid solution has grown crystal grains which are of a fine globular grain, has excellent melting property, resistance to devitrification and polishing processability, has superior flatness and smoothness in the surface after polishing, and has a high value of Young's modulus and a low value of specific gravity capable of coping with driving of the disk with a high speed rotation.

For achieving the above described object of the invention, there is provided a high rigidity glass-ceramic substrate for a magnetic information storage medium having a ratio of Young's modulus to specific gravity within a range from 37 to 63 and comprising $Al_2O_3$ within a range from 10% to less than 20%.

In one aspect of the invention, the high rigidity glass-ceramic substrate is substantially free of $Na_2O$, $K_2O$, $Li_2O$ and PbO.

In another aspect of the invention, predominant crystal phases in the substrate consist of (1) cordierite or cordierite solid solution and (2) one or more crystals selected from the group consisting of Spinel crystal, Spinel crystal solid solution, enstatite, enstatite solid solution, β-quartz and β-quartz solid solution.

In another aspect of the invention, this substrate is provided by heat treating a base glass having a composition expressed on the basis of composition of oxides which consists in weight percent of:

| | |
|---|---|
| $SiO_2$ | 40–60% |
| MgO | 10–20% |
| $Al_2O_3$ | 10–less than 20% |
| $P_2O_5$ | 0–4% |
| $B_2O_3$ | 0–4% |
| CaO | 0.5–4% |
| BaO | 0–5% |
| $ZrO_2$ | 0–5% |
| $TiO_2$ | 2.5–8% |
| $Sb_2O_3$ | 0–1% |
| $As_2O_3$ | 0–1% |
| F | 0–3% |
| $SnO_2$ | 0–5% |
| $MoO_3$ | 0–3% |
| CeO | 0–5% |
| $Fe_2O_3$ | 0–5% |

In another aspect of the invention, a grain diameter of the respective predominant crystal phases is within a range from 0.05 μm to 0.30 μm.

In another aspect of the invention, a coefficient of thermal expansion within a range from −50° C. to +70° C. is within a range from $30 \times 10^{-7}$/° C. to $50 \times 10^{-7}$/° C.

In another aspect of the invention, the surface of the substrate after polishing has surface roughness (Ra) of 3 to 9 Å and maximum surface roughness (Rmax) of 100 Å or below.

In another aspect of the invention, the high rigidity glass-ceramic substrate is provided by heat treating the base glass at a nucleation temperature within a range from 650° C. to 750° C. and at a crystallization temperature within a range from 750° C. to 1050° C.

In still another aspect of the invention, there is provided a magnetic information storage disk having a film of a magnetic medium formed on said high rigidity glass-ceramic substrate.

In this specification, "Spinel crystal" means at least one crystal selected from the group consisting of (Mg and/or Zn)$Al_2O_4$, (Mg and/or Zn)$_2TiO_4$, and a mixture in the form of a solid solution of these two types of crystals. The term "solid solution" in this specification means each of the above described crystals a part of which is substituted by other ingredient or in which other ingredient has been mixed. The term "β-quartz solid solution" means β-quartz crystal a part of which is substituted by an element other than Si or in which an element other than Si is mixed. β-quartz solid solution includes β-eucryptite (β-$Li_2O \cdot Al_2O_3 \cdot 2SiO_2$) in which Li and Al at the ratio of one to one partly substitute Si, β-eucryptite solid solution which is β-eucryptite crystal a part of which is substituted by other element or in which other element has been mixed, and a mixture thereof.

DETAILED DESCRIPTION OF THE INVENTION

Reasons for limiting the physical properties, predominant crystal phases and crystal grain diameter, surface characteristics and composition of the glass-ceramics of the present invention will now be described. The composition of the glass-ceramics is expressed on the basis of composition of oxides as in their base glass.

Young's modulus and specific gravity will first be described. As described previously, there has been an increasing tendency toward driving of a magnetic information storage medium with a high-speed rotation for improving the recording density and data transfer rate. It has been found by the inventors of the present invention that, for sufficiently conforming to such tendency, a material for a magnetic information storage medium must have high rigidity and low specific gravity in order to prevent vibration caused by deflection of the disk which occurs during high speed rotation of the disk, e.g., 10,000 rev/min. or over. A disk which has high rigidity but high specific gravity causes deflection during a high speed rotation with resulting vibration of the disk. It has been found that an apparently contradictory balance of physical properties of the material must be adopted, namely high rigidity and low specific gravity and this balance has been found to exist in the ratio of Young's modulus (GPa) to specific gravity within a range from 37 to 63. A preferable range of Young's modulus(GPa)/specific gravity is 40 to 63, a more preferable range thereof is 47 to 63 and the most preferable range thereof is 50 to 63. It has been also found that there is a preferable range of rigidity, That is, from the standpoint of preventing vibration, the material should preferably have rigidity of at least 120 GPa even if it has low specific gravity but, having regard to processability and increase of specific gravity, the upper limit of rigidity should preferably be 150 GPa. The same applies to specific gravity. That is, from the standpoint of preventing vibration, the material should preferably have specific gravity of 3.50 or less even if it has high rigidity, because otherwise vibration tends to occur during a high speed rotation due to its weight, but the material should preferably have specific gravity of 2.3 or over because otherwise it is difficult to obtain a substrate having desired rigidity. A more preferable range of specific gravity from these standpoints is 2.5 to 3.3.

If a material for a substrate contains $Na_2O$, $K_2O$ or $Li_2O$, Na ion, K ion or Li ion of these ingredient diffuses into a magnetic film during the film forming process when the temperature of the substrate rises to a high temperature (this phenomenon is particularly remarkable in a barium ferrite perpendicular magnetic film) and thereby causes abnormal growth of grains of the magnetic film and deterioration of orientation of the magnetic film. It is therefore important that the material of the substrate is substantially free of such ingredients. The material of the substrate should also be substantially free of PbO which is not desirable because of the environmental problems.

Description of predominant crystal phases of the substrate of the invention will now be described. In one aspect of the invention, predominant crystal phases consist of (1) cordierite or cordierite solid solution and (2) one or more crystals selected from the group consisting of Spinel crystal, Spinel crystal solid solution, enstatite, enstatite solid solution, β-quartz and β-quartz solid solution. This is because these crystal phases are advantageous in that they have excellent processability, contribute to increase in rigidity, can have a relatively small grain diameter of grown crystal, and can realize a much lower specific gravity than other crystal phases. Growth and content ratio of crystal phases of cordierite, Spinel crystal, enstatite and β-quartz are determined by the content ratio of MgO, $SiO_2$, and $Al_2O_3$. Growth and content ratio of these four crystal phases and solid solution of these four crystal phases are determined by the content ratio Of MgO, $SiO_2$, $Al_2O_3$ and other ingredients.

Description will now be made about crystal grain diameter of grown crystal and surface roughness. As was previously described, for coping with the near contact recording system and the contact recording system for improving the recording density, the smoothness of the surface of the magnetic information storage medium must be improved over the conventional magnetic medium. If one attempts to carry out high density inputting and outputting of information on the magnetic medium having the conventional level of smoothness, the distance between the magnetic head and the surface of the magnetic medium is so large that inputting and outputting of magnetic signals cannot be achieved. If one attempts to reduce this distance, the magnetic head will collide with projections of the magnetic medium resulting in damage of the magnetic head or magnetic medium. For coping with the near contact recording system and the contact recording system, it has been found that the substrate should have smoothness expressed in terms of surface roughness (Ra) of 3 to 9 Å and maximum surface roughness (Rmax) of 100 Å or below. Preferably, the surface roughness (Ra) should be 3 to 7 Å and the maximum surface roughness (Rmax) should be 95 Å or below. More preferably, the surface roughness (Ra) should be 3 to 6 Å and the maximum surface roughness (Rmax) should be 90 Å or below.

For obtaining a glass-ceramic substrate having a high rigidity and high flatness (3–9 Å in the data area) as in the present invention, the crystal grain diameter and crystal grain shape are important factors. It has been found that a substrate having a grain diameter which is larger or smaller than the range of diameter defined in the claims cannot achieve the desired strength and surface roughness.

In increasing the bit number and track density and reducing the size of the bit cell, difference in coefficient of thermal expansion between the magnetic film and the substrate significantly affects achievements of these objects. For this reason, it has been found that the coefficient of thermal expansion within a temperature range from $-50°$ C. to $+70°$ C. should preferably be within a range from $30\times10-7/°$ C. to $50\times10^{-7}/°$ C.

In the glass-ceramic substrate according to the invention, the above described content ranges of the respective ingredients have been selected for the reasons stated below.

The $SiO_2$ ingredient is a very important ingredient which, by heating a base glass, forms cordierite, cordierite solid solution, enstatite, enstatite solid solution, β-quartz and β-quartz solid solution crystals as predominant crystal phases. If the amount of this ingredient is below 40%, the crystal phases grown in the glass-ceramic are instable and their texture tends to become too rough whereas if the amount of this ingredient exceeds 60%, difficulty arises in melting and forming the base glass. For the growth of the crystal phases, conditions of heat treatment are also important factors. A preferable range of this ingredient which enables a broadened heat treatment conditions is 48.–58.5%.

The MgO ingredient also is a very important ingredient which, by heating a base glass, forms cordierite, cordierite solid solution, Spinel crystal, Spinel crystal solid solution, enstatite, enstatite solid solution, β-quartz and β-quartz solid solution as predominant crystal phases. If the amount of this ingredient is below 10%, desired crystals cannot be obtained and the grown crystals of the obtained glass-ceramic are instable, and their texture is too rough and melting property deteriorates. If the amount of this ingredient exceeds 20%, resistance to devitrification is reduced. A preferable range of this ingredient is 13–20% for the same reason as in the $SiO_2$ ingredient.

The $Al_2O_3$ ingredient is a very important ingredient which, by heating of a base glass, forms cordierite, cordierite solid solution, Spinel crystal, Spinel crystal solid solution, β-quartz and β-quartz solid solution as predominant crystal phases. If the amount of this ingredient is below 10%, desired crystals cannot be obtained and the grown crystals of the obtained glass-ceramic are instable and their texture is too rough and melting property deteriorates. If the amount of this ingredient is 20% or over, melting property of the base glass and resistance to devitrification are deteriorated and, moreover, the amount of Spinel crystal increases excessively with the result that hardness of the substrate becomes so large that processability in processes such as polishing is reduced significantly. For the same reason as in the above ingredients, a preferable range of this ingredient is 10 to less than 18% and a more preferable range is 10–17%.

The $P_2O_5$ ingredient functions as a nucleating agent for the glass and also is an ingredient which is effective for improving melting and molding properties of the base glass and for improving resistance to devitrification. The amount of this ingredient up to 4% will suffice for these purposes. A preferable range of this ingredient is 1–3%.

The $B_2O_3$ ingredient is effective for controlling viscosity during melting and forming of the base glass. The amount of this ingredient up to 4% will suffice.

The CaO ingredient is an ingredient which improves melting property of the base glass and prevents grown crystals from becoming too rough. If the amount of this ingredient is below 0.5%, these effects cannot be obtained whereas if the amount of this ingredient exceeds 4%, the grown crystals become too rough, the crystal phases undergo change and chemical durability of the glass-ceramic deteriorates. A preferable range of this ingredient is 1–3%.

The BaO ingredient may be add for improving melting property of the glass. The amount of this ingredient up to 5% will suffice. A preferable range of this ingredient is 1–3%.

The $ZrO_2$ and $TiO_2$ ingredients are very important ingredients which function as a nucleating agent for the glass and also are effective for making the grown crystal grains finer and improving mechanical strength and chemical durability of the material. The amount of the $ZrO_2$ ingredient up to 5% will suffice. As for the $TiO_2$ ingredient, if the amount of this ingredient is below 2.5%, the above effects cannot be obtained whereas if the amount of this ingredient exceeds 8%, difficulty arises in melting of the base glass and resistance to devitrification deteriorates. For the same reason as in the $SiO_2$ ingredient, a preferable range of this ingredient is 2–8%.

The $Sb_2O_3$ and/or $As_2O_3$ ingredients may be added as refining agents in melting the glass. It will suffice if each ingredient is added up to 1%.

The F ingredient may be added for improving melting property of the glass. It will suffice if this ingredient is added up to 3%.

The $SnO_2$, $MoO_3$, CeO and $Fe_2O_3$ ingredients may be added up to the total amount of 5% as a coloring agent or for improving sensitivity of detecting defects on the surface of the substrate by coloring the substrate and also improving laser absorption characteristics for an LD excited laser. As to $MoO_3$, it will suffice if the the $MoO_3$ ingredient up to 3% is added. The $SnO_2$ and $MoO_3$ ingredients are important in that they have light transmissivity in the glass state before the heat treatment and have the coloring property after the crystallization processing.

For manufacturing the glass-ceramic substrate for a magnetic information storage medium according to the invention, the base glass having the above described composition is melted, is subjected to heat forming and/or cold forming, is heat treated for producing a crystal nucleus under a temperature within a range from 650° C. to 750° C. for about one to twelve hours, and further is heat treated for crystallization under a temperature within a range from 750° C. to 1050° C. for about one to twelve hours.

EXAMPLES

Examples of the present invention will now be described.

Tables 1 to 7 show examples (No. 1 to No. 17) of compositions of the glass-ceramic substrate for a magnetic information storage medium made according to the invention and three comparative examples, i.e., the prior art chemically tempered alumino-silicate glass (Japanese Patent Application Laid-open No. Hei 8-48537), Comparative Example No. 1, the $Li_2O$—$SiO_2$ glass-ceramics (Japanese Patent Application Laid-open No. Hei 9-35234, Comparative Example No. 2, and the $SiO_2$—$Al_2O_3$—MgO—ZnO—$TiO_2$ glass-ceramics (Japanese Patent Application Laid-open No. Hei 9-77531), Comparative Example No. 3 together with the temperature of nucleation, temperature of crystallization, crystal phase, crystal grain diameter, Young's modulus, specific gravity, Young's modulus (GPa)/specific gravity, surface roughness (Ra) after polishing, maximum surface roughness (Rmax) after polishing, and coefficient of thermal expansion in the range from –50° C. to +70° C. Amounts of the respective ingredients are expressed in weight percent.

TABLE 1

| | Examples | | |
|---|---|---|---|
| | 1 | 2 | 3 |
| $SiO_2$ | 54.0 | 56.8 | 57.5 |
| MgO | 14.0 | 16.0 | 16.0 |
| $Al_2O_3$ | 19.5 | 17.0 | 14.0 |
| $P_2O_5$ | — | — | 1.0 |
| $B_2O_3$ | — | 1.0 | 2.0 |
| CaO | 2.0 | 2.2 | 2.5 |
| BaO | 2.0 | — | — |
| $ZrO_2$ | — | — | 0.5 |
| $TiO_2$ | 5.0 | 5.5 | 6.0 |
| $Sb_2O_3$ | — | — | — |
| $As_2O_3$ | 0.5 | 0.5 | 0.5 |
| F | — | — | — |
| $Fe_2O_3$ | 3.0 | 1.0 | — |
| Nucleation temperature (° C.) | 670 | 700 | 680 |
| Crystallization temperature (° C.) | 1000 | 950 | 930 |
| Predominant crystal phases and grain diameter | cordierite 0.3 µm Spinel crystal 0.1 µm | cordierite 0.3 µm Spinel crystal 0.1 µm | cordierite 0.3 µm enstatite 0.1 µm |
| Young's modulus (GPa) | 135 | 128 | 143 |
| Specific gravity (g/cc) | 2.65 | 2.60 | 2.58 |
| Young's modulus (GPa)/specific gravity | 50.9 | 49.2 | 55.4 |
| Surface roughness Ra (Å) | 9 | 7 | 8 |
| Maximum surface roughness Rmax (Å) | 98 | 81 | 78 |
| Coefficient of thermal expansion ($\times 10^{-7}$/° C.) (–50° C. to +70° C.) | 37 | 35 | 46 |

TABLE 2

| | Examples | | |
|---|---|---|---|
| | 4 | 5 | 6 |
| $SiO_2$ | 57.1 | 45.6 | 56.0 |
| MgO | 14.0 | 18.0 | 10.4 |
| $Al_2O_3$ | 17.9 | 19.5 | 15.0 |
| $P_2O_5$ | — | 3.0 | — |
| $B_2O_3$ | 3.0 | 2.5 | 3.0 |
| CaO | 2.0 | 2.0 | 3.8 |
| BaO | — | 0.5 | — |
| $ZrO_2$ | — | — | — |
| $TiO_2$ | 5.5 | 8.0 | 7.0 |

TABLE 2-continued

| | Examples | | |
|---|---|---|---|
| | 4 | 5 | 6 |
| $Sb_2O_3$ | — | — | — |
| $As_2O_3$ | 0.5 | 0.9 | — |
| F | — | — | — |
| $Fe_2O_3$ | — | — | 4.8 |
| Nucleation temperature (° C.) | 650 | 650 | 720 |
| Crystallization temperature (° C.) | 980 | 940 | 1000 |
| Predominant crystal phases and grain diameter | cordierite 0.3 μm β-quartz 0.1 μm | cordierite 0.3 μm β-quartz 0.1 μm | cordierite 0.3 μm β-quartz 0.1 μm |
| Young's modulus (GPa) | 133 | 121 | 141 |
| Specific gravity (g/cc) | 2.64 | 2.50 | 2.90 |
| Young's modulus (GPa)/specific gravity | 50.4 | 48.4 | 48.6 |
| Surface roughness Ra (Å) | 5 | 4 | 9 |
| Maximum surface roughness Rmax (Å) | 64 | 48 | 94 |
| Coefficient of thermal expansion ($\times 10^{-7}$/° C.) (−50° C. to +70° C.) | 30 | 48 | 36 |

TABLE 3

| | Examples | | |
|---|---|---|---|
| | 7 | 8 | 9 |
| $SiO_2$ | 59.5 | 60.0 | 41.7 |
| MgO | 17.0 | 19.5 | 17.0 |
| $Al_2O_3$ | 12.0 | 10.9 | 18.7 |
| $P_2O_5$ | 3.0 | 0.9 | 3.9 |
| $B_2O_3$ | 2.0 | 1.5 | 1.0 |
| CaO | 0.5 | — | 3.8 |
| BaO | 2.0 | — | — |
| $ZrO_2$ | — | — | 2.8 |
| $TiO_2$ | 4.0 | 3.5 | 6.6 |
| $Sb_2O_3$ | — | 0.9 | 0.5 |
| $As_2O_3$ | — | — | — |
| F | — | 2.8 | — |
| $Fe_2O_3$ | — | — | 4.0 |
| Nucleation temperature (° C.) | 700 | 730 | 750 |
| Crystallization temperature (° C.) | 960 | 1000 | 1050 |
| Predominant crystal phases and grain diameter | cordierite 0.3 μm β-quartz 0.1 μm | cordierite 0.3 μm β-quartz 0.1 μm | cordierite 0.3 μm β-quartz 0.1 μm |
| Young's modulus (GPa) | 138 | 120 | 151 |
| Specific gravity (g/cc) | 2.81 | 2.60 | 2.65 |
| Young's modulus (GPa)/specific gravity | 49.1 | 46.2 | 57.0 |
| Surface roughness Ra (Å) | 6 | 8 | 7 |
| Maximum surface roughness Rmax (Å) | 70 | 78 | 67 |
| Coefficient of thermal expansion ($\times 10^{-7}$/° C.) (−50° C. to +70° C.) | 32 | 41 | 38 |

TABLE 4

| | Examples | | |
|---|---|---|---|
| | 10 | 11 | 12 |
| $SiO_2$ | 45.1 | 55.0 | 56.0 |
| MgO | 18.0 | 18.0 | 11.0 |
| $Al_2O_3$ | 19.5 | 10.0 | 14.5 |
| $P_2O_5$ | 3.0 | 1.0 | 2.0 |
| $B_2O_3$ | 2.5 | 3.5 | 3.0 |
| CaO | 2.0 | 3.0 | 4.0 |
| BaO | 0.5 | 1.0 | 4.0 |
| $ZrO_2$ | — | 5.0 | — |
| $TiO_2$ | 7.5 | 2.5 | 4.0 |
| $Sb_2O_3$ | — | 0.5 | 0.5 |
| $As_2O_3$ | 0.9 | — | — |
| F | — | — | — |
| $Fe_2O_3$ | $SnO_2 = 1.0$ | $MoO_3 = 0.5$ | $CeO = 1.0$ |
| Nucleation temperature (° C.) | 650 | 750 | 670 |
| Crystallization temperature (° C.) | 940 | 1050 | 1050 |
| Predominant crystal phases and grain diameter | cordierite 0.3 μm β-quartz 0.1 μm | cordierite 0.3 μm β-quartz 0.1 μm | cordierite 0.3 μm β-quartz 0.1 μm |
| Young's modulus (GPa) | 121 | 143 | 122 |
| Specific gravity (g/cc) | 2.50 | 2.90 | 2.70 |
| Young's modulus (GPa)/specific gravity | 48.4 | 49.3 | 45.2 |
| Surface roughness Ra (Å) | 4 | 6 | 8 |
| Maximum surface roughness Rmax (Å) | 48 | 78 | 76 |
| Coefficient of thermal expansion ($\times 10^{-7}$/° C.) (−50° C. to +70° C.) | 48 | 36 | 41 |

TABLE 5

| | Examples | | |
|---|---|---|---|
| | 13 | 14 | 15 |
| $SiO_2$ | 55.5 | 50.0 | 56.2 |
| MgO | 18.0 | 13.0 | 11.0 |
| $Al_2O_3$ | 10.0 | 18.0 | 14.5 |
| $P_2O_5$ | 1.0 | 3.1 | 2.0 |
| $B_2O_3$ | 3.5 | 3.9 | 3.0 |
| CaO | 3.0 | 1.0 | 4.0 |
| BaO | 1.0 | 3.0 | 4.8 |
| $ZrO_2$ | 5.0 | — | — |
| $TiO_2$ | 2.5 | 7.5 | 4.0 |
| $Sb_2O_3$ | 0.5 | 0.5 | 0.5 |
| $As_2O_3$ | — | — | — |
| F | — | — | — |
| $Fe_2O_3$ | — | — | — |
| Nucleation temperature (° C.) | 750 | 670 | 670 |
| Crystallization temperature (° C.) | 1050 | 900 | 1050 |
| Predominant crystal phases and grain diameter | cordierite 0.3 μm β-quartz 0.1 μm | cordierite 0.1 μm β-quartz 0.1 μm | cordierite 0.3 μm β-quartz 0.1 μm |
| Young's modulus (GPa) | 143 | 120 | 122 |
| Specific gravity (g/cc) | 2.90 | 3.10 | 2.70 |
| Young's modulus (GPa)/specific gravity | 49.3 | 38.7 | 45.2 |
| Surface roughness Ra (Å) | 6 | 5 | 8 |
| Maximum surface roughness Rmax (Å) | 78 | 49 | 76 |
| Coefficient of thermal expansion ($\times 10^{-7}$/° C.) (−50° C. to +70° C.) | 36 | 42 | 41 |

TABLE 6

| | Examples | |
|---|---|---|
| | 16 | 17 |
| $SiO_2$ | 55.0 | 53.5 |
| MgO | 15.0 | 15.0 |
| $Al_2O_3$ | 17.0 | 18.0 |
| $P_2O_5$ | 1.0 | 2.0 |
| $B_2O_3$ | 2.0 | — |
| CaO | 1.0 | 2.0 |
| BaO | 4.0 | 2.0 |

TABLE 6-continued

|  | Examples | |
|---|---|---|
|  | 16 | 17 |
| $ZrO_2$ | — | — |
| $TiO_2$ | 4.5 | 7.0 |
| $Sb_2O_3$ | 0.5 | — |
| $As_2O_3$ | — | 0.5 |
| F | — | — |
| $Fe_2O_3$ | — | — |
| Nucleation temperature (° C.) | 700 | 700 |
| Crystallization temperature (° C.) | 950 | 970 |
| Predominant crystal phases and grain diameter | cordiente 0.3 μm β-quartz 0.1 μm | cordierite 0.3 μm β-quartz 0.1 μm |
| Young's modulus (GPa) | 128 | 134 |
| Specific gravity (g/cc) | 2.80 | 2.77 |
| Young's modulus (GPa)/specific gravity | 44.4 | 48.4 |
| Surface roughness Ra (Å) | 7 | 6 |
| Maximum surface roughness Rmax (Å) | 68 | 61 |
| Coefficient of thermal expansion ($\times 10^{-7}$/° C.) (−50° C. to +70° C.) | 37 | 30 |

TABLE 7

|  | Comparative Example | | |
|---|---|---|---|
|  | 1 | 2 | 3 |
| $SiO_2$ | 62.0 | 78.5 | 43.0 |
| MgO | — | — | — |
| $Al_2O_3$ | 16.0 | 4.4 | 26.8 |
| $P_2O_5$ | — | 2.0 | — |
| ZnO | — | — | 23.0 |
| $Li_2O$ | 7.0 | 12.5 | — |
| Other alkali ingredients | $Na_2O$ 9.0 | $K_2O$ 2.8 | $K_2O$ 2.4 |
| $ZrO_2$ | 4.0 | — | — |
| $TiO_2$ | — | — | — |
| $Sb_2O_3$ | 0.5 | 0.2 | — |
| $As_2O_3$ | — | — | — |
| $SnO_2$ | — | — | — |
| $MoO_3$ | — | — | — |
| CeO | — | — | — |
| Other ingredient | — | $Ga_2O_3$ | 4.8 |
| Nucleation temperature (° C.) | — | 450 | 800 |
| Crystallization temperature (° C.) | — | 850 | 950 |
| Predominant crystal phases and grain diameter | — | lithium disilicate 0.10 μm α-cristobalite 0.30 μm | Spinel crystal 0.10 μm — — |
| Young's modulus (GPa) | 82 | 92 | 110.5 |
| Specific gravity (g/cc) | 2.54 | 2.51 | 3.24 |
| Young's modulus (GPa)/specific gravity | 32.3 | 36.0 | 34.1 |
| Surface roughness Ra (Å) | 8 | 11 | 65 |
| Maximum surface roughness Rmax (Å) | 86 | 140 | 679 |
| Coefficient of thermal expansion ($\times 10^{-7}$/° C.) (−50° C. to +70° C.) | 70 | 61 | 53 |

For manufacturing the glass-ceramic substrate of the above described examples, materials including oxides, carbonates and nitrates are mixed and molten in a conventional melting apparatus at a temperature within the range from about 1350° C. to about 1450° C. The molten glass is stirred to homogenize it and thereafter formed into a disk shape and annealed to provide a formed glass. Then, this formed glass is subjected to heat treatment to produce the crystal nucleus under a temperature within the range from 650° C. to 750° C. for about one to twelve hours and then is subjected to a further heat treatment for crystallization under a temperature within the range from 750° C. to 1050° C. for about one to twelve hours to produce the desired glass-ceramic. Then, this glass-ceramic is lapped with lapping grains having average grain diameter ranging from 5 μm to 30 μm for about 10 minutes to 60 minutes and then is finally polished with cerium oxide having average grain diameter ranging from 0.5 μm to 2 μm for about 30 minutes to 60 minutes.

As shown in Tables 1 to 7, the glass-ceramic of the present invention is different in its predominant crystal phase from the Comparative Examples of prior art alimino-silicate chemically tempered glass, $Li_2O$—$SiO_2$ glass-ceramics and $SiO_2$—$Al_2O_3$—MgO—ZnO—$TiO_2$ glass-ceramics. As regards Young's modulus and specific gravity, the glass-ceramic of the present invention has higher rigidity or lower specific gravity than the alumino-silicate chemically tempered glass and the $Li_2O$—$SiO_2$ glass-ceramics. The $SiO_2$—$Al_2O_3$—MgO—ZnO—$TiO_2$ glass-ceramics of Comparative Example No. 3 which is of a relatively high rigidity and low specific gravity is so hard that a desired surface roughness cannot be obtained. In contrast, the glass-ceramics of the present invention has excellent processability and desired smoothness. Moreover, the glass-ceramic of the present invention is free from such defects as anisotropic crystals, foreign matters and impurities and has a fine and homogeneous texture and sufficient chemical durability against rinsing or etching with chemicals or water.

As described above, according to the invention, there is provided a glass-ceramic substrate for a magnetic information storage medium which has eliminated the disadvantages of the prior art materials and has excellent melting property, resistance to devitrification and processability, has sufficient smoothness for coping with the contact recording with a high recording density and has also high Young's modulus and low specific gravity characteristics capable of coping properly with driving of the disk with high speed rotation. According to the invention, there are also provided a method for manufacturing this glass-ceramic and a magnetic information storage disk having a film of a magnetic medium formed on the glass-ceramic substrate.

What is claimed is:

1. A high rigidity glass-ceramic substrate for a magnetic information storage medium having a ratio of Young's modulus to specific gravity within a range from 37 to 63, which comprises $Al_2O_3$ within a range from 10% to less than 20%, wherein the predominant crystal phases consist of (1) cordierite or cordierite solid solution and (2) one or more crystals selected from the group consisting of Spinel crystal, Spinel crystal solid solution, enstatite, enstatite solid solution, β-quartz and β-quartz solid solution.

2. A high rigidity glass-ceramic substrate as defined in claim 1 which is substantially free of $Na_2O$, $K_2O$, $Li_2O$ and PbO.

3. A high rigidity glass-ceramic substrate as defined in claim 1 wherein a crystal grain diameter of the respective predominant crystal phase is within a range from 0.05 μm to 0.30 μm.

4. A high rigidity glass-ceramic substrate as defined in claim 1 wherein coefficient of thermal expansion within a range from −50° C. to +70° C. is within a range from $30 \times 10^{-7}$/° C. to $50 \times 10^{-7}$/° C.

5. A high rigidity glass-ceramic substrate as defined in claim 1 wherein the surface of the substrate after polishing has surface roughness (Ra) of 3 to 9 Å and maximum surface roughness (Rmax) of 100 Å or below.

6. A high rigidity glass-ceramic substrate as defined in claim 1 provided by heat treating a base glass having a composition expressed on the basis of composition of oxides which consists in weight percent of:

| | |
|---|---|
| $SiO_2$ | 40–60% |
| MgO | 10–20% |
| $Al_2O_3$ | 10–less than 20% |
| $P_2O_5$ | 0–4% |
| $B_2O_3$ | 0–4% |
| CaO | 0.5–4% |
| BaO | 0–5% |
| $ZrO_2$ | 0–5% |
| $TiO_2$ | 2.5–8% |
| $Sb_2O_3$ | 0–1% |
| $As_2O_3$ | 0–1% |
| F | 0–3% |
| $SnO_2$ | 0–5% |
| $MoO_3$ | 0–3% |

-continued

| | |
|---|---|
| CeO | 0–5% |
| $Fe_2O_3$ | 0–5%. |

7. A high rigidity glass-ceramic substrate for a magnetic information storage medium as defined in claim 6 provided by heat treating the base glass at a nucleation temperature within a range from 650° C. to 750° C. and at a crystallization temperature within a range from 750° C. to 1050° C.

8. A magnetic information storage disk having a film of a magnetic medium formed on said high rigidity glass-ceramic substrate as defined in claim 1.

* * * * *